Patented Jan. 5, 1937

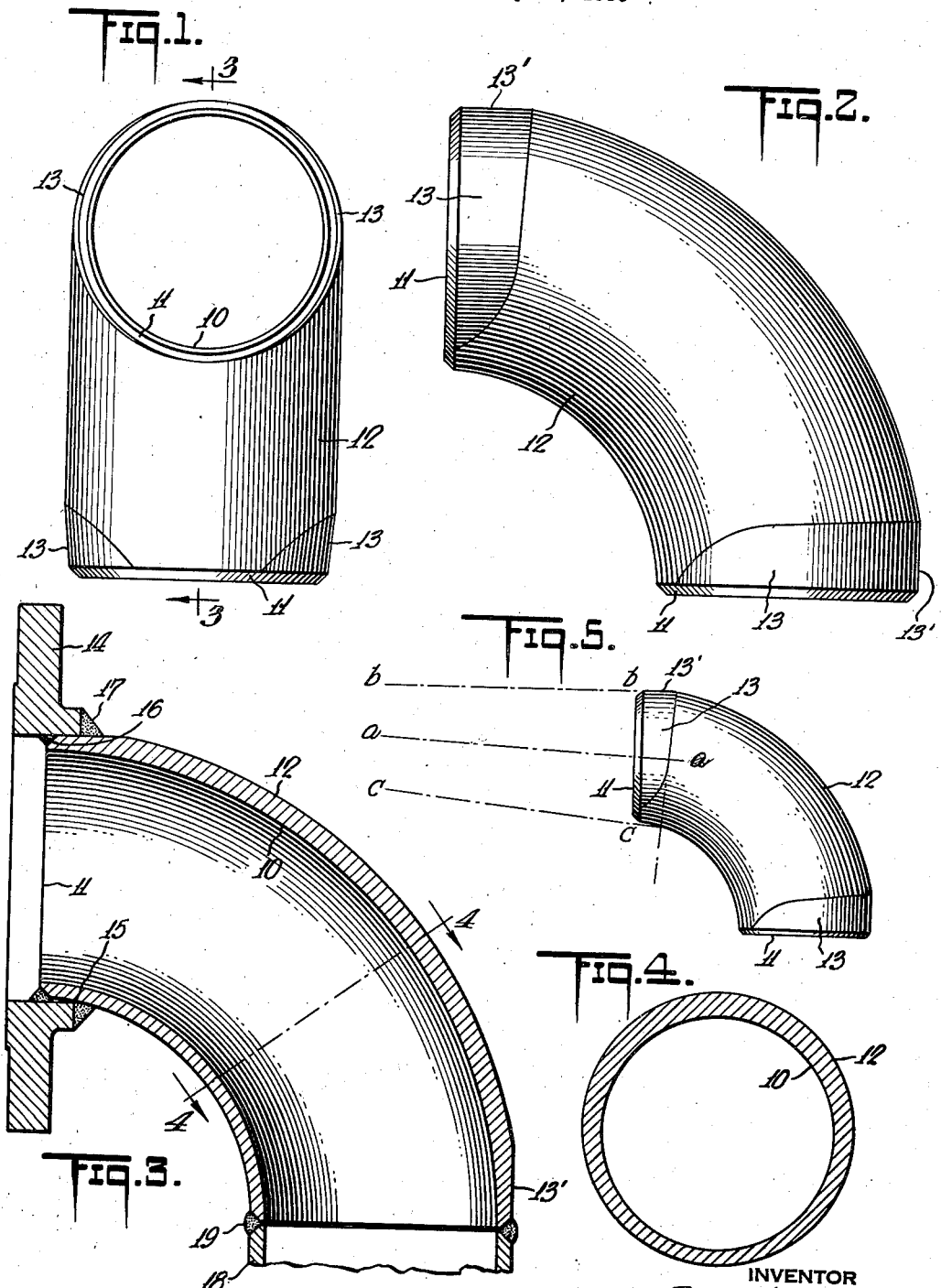

2,066,775

UNITED STATES PATENT OFFICE 2,066,775

PIPE FITTING

Rudolph E. Fritsch, Louisville, Ky., assignor to Tube-Turns, Incorporated, Louisville, Ky., a corporation of Kentucky Application July 16, 1935, Serial No. 31,554

5 Claims. (Cl. 285—211)

The present invention is an improvement in pipe bends of that type in which the wall along the side of maximum radius is of substantially greater thickness than the wall along the side of minimum radius, and the thickness of the wall progressively increases circumferentially of the pipe from the shorter or minimum radius side to the longer outer or maximum radius side.

In this type of construction, the portions of the wall which are subjected to the greatest erosion or corrosion under flow of fluids at high velocity through the pipe bend, are best able to withstand such action, and the structural strength is greatest along the line where occur the greatest stresses imposed by the kinetic energy of the fluid.

The economical manufacture of such tube bends from straight pipe sections by the advancement of the pipe sections through the forging, bending or other forming apparatus, ordinarily results in the thickness of the wall being uniform from one end of the pipe bend to the other along any particular line concentric with the axis of curvature of the pipe bend.

In the commercial use of pipe bends, it is customary to either butt-weld the ends directly to straight pipe sections or to provide a pipe bend with flanged collars, whereby it may be bolted to pipe sections or other parts. In any such connecting of the pipe bend to other pipe sections or parts, it is obviously desirable that the passages at the ends of the pipe bend properly register with those of the pipe sections or other parts, and without shoulders or obstructions which will interfere with the free flow of fluids.

The main object of my invention is to provide a pipe bend of the type above referred to, and which is so formed adjacent to its ends that it may be either directly butt-welded to a pipe having the same inside diameter, or may be provided with a flanged collar which, when bolted to a corresponding collar on a pipe, will bring the connected passages into proper registry.

In carrying out my invention, the terminal portions of the pipe bend are formed of substantially uniform thickness, circumferentially of the pipe bend to facilitate butt-welding to a pipe of equal wall thickness, and portions of the outer surface are tapered so as to facilitate the proper application and positioning of a flanged collar in the plane of the end of the pipe.

A preferred embodiment of my invention is illustrated in the accompanying drawing in which:—

Fig. 1 is an end elevational view,

Fig. 2 is a side elevation,

Fig. 3 is a section on the line 3—3 of Fig. 1, but showing one end of the pipe bend butt-welded to a pipe section and the other end provided with a collar, Fig. 4 is a transverse section on the line 4—4 of Fig. 3, and Fig. 5 is a view similar to Fig. 2 but on a smaller scale, and showing by dot and dash lines the angle which the outer surface at the terminal portions bears to the remainder of the pipe bend.

In the manufacture of pipe bends by the method disclosed in the Bohling Patent 1,353,714, issued September 21, 1920, it has been discovered that by certain variations in the control of the temperature of different regions of the area of the blank which is being forced over the mandrel, a pipe bend may be produced of the type above referred to with the desired differences in thickness of the longer or outer and the shorter or inner sides, and with the thickness uniform from one end to the other along any circular arc about the axis of curvature. As a result of such method, a bend 12 may be made having a bore 10 of uniform cross-section throughout its length and uniformly curved through an arc of 90°, 180° or other angular extent. The ends 11 may be cut or formed in radial planes of the center of curvature.

In the construction illustrated, the pipe bend extends through an arc of 90° and the two ends 11 are at right angles to each other.

It will be noted particularly from Figs. 3 and 4 that the wall along the outer or longer side is materially thicker than the wall along the inner or shorter side, and that the wall is of uniform thickness throughout substantially the entire length of the pipe bend along all points at any particular distance from the center of curvature.

As one important feature of the invention, a portion of the outer surface of the pipe bend is cut away so that the wall of the pipe bend is of substantially uniform thickness circumferentially at each extremity 11. To accomplish this cutting operation, the pipe bend is operated upon by a tool or cutter which is preferably rotatable about an axis represented by the line a—a in Fig. 5, and the portion of the surface is cut away, which extends beyond a slightly conical surface represented by the two dot and dash lines b—b and c—c which converge slightly toward the line a—a and would meet the latter at the same point at an extension of said line a—a at the left of Fig. 5. The angle of the line a—a to the end 11 of the pipe bend, and the angle of the line b—b to the line a—a is such that the line b—b is substantially at right angles to the plane of the end 11. By cutting the pipe bend in this way there is formed a slightly conical surface 13 which is of the maximum width along the outer or long side of the pipe bend where the thickness of the material is the greatest. This conical surface decreases in width toward the inner or short side of the pipe bend, and may terminate at a short distance from said inner or short side so that there is no cutting of the wall in this area.

By cutting the pipe bend in this way, it will be noted that the portion 13' of the surface 13 will be at right angles to the plane of the end 11, and therefore when a flanged collar 14 is slid on to the end of the pipe bend, it may rest upon the surface 13' and will lie in a plane parallel to the plane of the end 11. The extent to which the flanged collar may be slid on will of course depend upon the internal diameter of the collar, but when the parts are properly proportioned the extent will be limited by the engagement of the collar with the outside surface of the shorter or inner side of the pipe bend as indicated at the point 15 in Fig. 3. With the flanged collar in this position, it may be permanently secured in place by welding 16 along the end 11 and by welding 17 around the circumference of the pipe bend. Although templets or other guides or supports may be employed for holding the collar 14 in predetermined position in regard to the pipe bend during welding, it will be noted that the formation of the surface 13' at right angles to the end 11 may be utilized as the sole means for insuring the accurate angular positioning of the collar.

By cutting the surface 13 in the manner and to the extent above described, it will be noted that the outer surface of the extreme end portion of the pipe bend will be concentric with the inner surface and therefore the pipe bend may be directly aligned with a straight pipe section 18 or any other tubular part of the proper diameter, and the two directly butt-welded together, for instance by a line of welding 19. To facilitate such welding of a pipe section to either end of the pipe bend, the end surface may be bevelled in the usual manner.

Although I have referred to the pipe bend being formed, prior to the machining, by the process of the Bohling patent, it will be understood that the forging or other forming may be accomplished by various other processes or types of apparatus.

Having thus described my invention, what I claim as new and desire to secure by Letters Patent is:—

1. A pipe bend having a wall thereof along the outer side of greater thickness than the wall along the shorter side, said outer wall being of substantially uniform thickness throughout the length thereof except for short sections adjacent to the ends, said short sections of said outer wall being slightly conical about an axis diverging slightly from a right angle to the plane of the end of the pipe bend, said conical surface continuing along the lateral sides of the pipe bend toward but not to the inner side of the pipe bend.

2. A pipe bend having the wall thereof along the longer outer side of greater thickness than the wall along the shorter inner side, and having the outside surface slightly conical adjacent to the end of the pipe bend, whereby the end portion is of substantially uniform thickness circumferentially of the pipe bend, the portion of said slightly conical surface along the longer outer side of the pipe bend being at right angles to the plane of the end of the pipe bend, said conical surface extending along the lateral sides toward but not to the shorter inner side of the pipe bend.

3. A pipe bend having a bore of substantially uniform cross-section throughout, the thickness of the wall of the bend throughout nearly the entire length thereof increasing progressively from the short inside radius of the bend to the long outside radius of the bend, said wall at any radius being of substantially the same thickness throughout nearly the entire length of the bend, the thicker wall portions closely adjacent to each end being externally tapered about an axis departing to a slight extent from right angles to the end plane of the pipe bend, said end plane being in the radius of curvature of the pipe bend.

4. A pipe bend having a bore of substantially uniform cross-section throughout, the thickness of the wall of the bend throughout nearly the entire length thereof increasing progressively from the short inside radius of the bend to the long outside radius of the bend, said wall at any radius being of substantially the same thickness throughout nearly the entire length of the bend, the thicker wall portions closely adjacent to each end being externally tapered, and the portion of said tapered surface along the outer or longer radius side of the bend being at right angles to the plane of the end of the bend, and said plane being in the radius of curvature of the pipe bend.

5. A pipe bend having a bore of substantially uniform cross-section throughout, the thickness of the wall of the bend throughout nearly the entire length thereof increasing progressively from the short inside radius of the bend to the long outside radius of the bend, said wall at any radius being of substantially the same thickness throughout nearly the entire length of the bend, the thicker wall portions closely adjacent to each end being externally tapered, and the portion of said tapered surface along the outer or longer radius side of the bend being at right angles to the plane of the end of the bend, and said plane being in the radius of curvature of the pipe bend, said tapered surface decreasing in width from the longer outer side of the pipe bend toward the shorter inner side thereof.

RUDOLPH E. FRITSCH.